(12) United States Patent
Lok et al.

(10) Patent No.: US 10,701,946 B2
(45) Date of Patent: Jul. 7, 2020

(54) METHOD FOR PREPARING A CASING MATERIAL USED IN A CO-EXTRUDING PROCESS OF A FOOD PRODUCT, VISCOUS GELLING AGENT AND A METHOD AND A SYSTEM FOR PREPARING FOOD PRODUCTS

(71) Applicant: MAREL TOWNSEND FURTHER PROCESSING B.V., Boxmeer (NL)

(72) Inventors: Geert Johannes Lok, Oisterwijk (NL); Johannes Marinus Quirinus Kools, Oudenbosch (NL); Johannes Martinus Meulendijks, Deurne (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 719 days.

(21) Appl. No.: 15/126,390

(22) PCT Filed: Mar. 12, 2015

(86) PCT No.: PCT/NL2015/050158
§ 371 (c)(1),
(2) Date: Sep. 15, 2016

(87) PCT Pub. No.: WO2015/142168
PCT Pub. Date: Sep. 24, 2015

(65) Prior Publication Data
US 2017/0079289 A1 Mar. 23, 2017

(30) Foreign Application Priority Data
Mar. 17, 2014 (NL) .................................... 2012455

(51) Int. Cl.
*A22C 11/00* (2006.01)
*A23P 30/25* (2016.01)
*A23L 13/60* (2016.01)

(52) U.S. Cl.
CPC ............ *A22C 11/001* (2013.01); *A23L 13/62* (2016.08); *A23L 13/65* (2016.08); *A23P 30/25* (2016.08); *A23V 2002/00* (2013.01)

(58) Field of Classification Search
CPC ..... A22C 11/00; A22C 11/02; A22C 11/0209; A22C 11/029; A22C 13/00; A22C 13/0003

(Continued)

(56) References Cited

U.S. PATENT DOCUMENTS 4,823,439 A * 4/1989 Schnell .................. A22C 11/02
452/31
6,139,416 A * 10/2000 Topfer ................... A22C 11/02
452/31

(Continued)

FOREIGN PATENT DOCUMENTS

WO 2009/145626 A1 12/2009
WO 2014/007630 A2 1/2014

OTHER PUBLICATIONS

Innternational Searching Authority, "Notification of Transmittal of The International Search Report and The Written Opinion of the International Searching Authority", for PCT/NL2015/050158, dated May 27, 2016, 13 pages.

*Primary Examiner* — Richard T Price, Jr.
(74) *Attorney, Agent, or Firm* — Workman Nydegger

(57) ABSTRACT

The invention relates to a method for preparing a casing material for use in co-extruding food products comprising the steps of providing two or more casing material components; mixing the casing material components and feeding the resulting viscous gelling solution to the co-extrusion process to form an external layer on an extruded strand of food dough. Each of the casing material components in itself is not suitable for co-extrusion as an external layer and the composition of the viscous gelling solution is determined by (Continued)

changing the volumes of the casing material components used dependent on the required food product to be co-extruded and/or the composition of the viscous gelling solution is adjusted by changing the volumes of the casing material components dependent on the information on the properties of the food dough and/or the food product to be co-extruded. The present invention further relates to a method and a system for preparing food products by means of co-extrusion wherein such casing material is used.

18 Claims, 2 Drawing Sheets

(58) Field of Classification Search
USPC ............ 452/21–23, 30–32, 35–37, 46–49, 51
See application file for complete search history.

(56) References Cited

U.S. PATENT DOCUMENTS

| | | | |
|---|---|---|---|
| 6,245,369 B1* | 6/2001 | Kobussen | A22C 11/0254 425/140 |
| 7,195,551 B2* | 3/2007 | Shefet | A22C 11/001 426/513 |
| 7,521,077 B2* | 4/2009 | Azzar | A22C 7/00 426/513 |
| 8,353,742 B1* | 1/2013 | Choi | A21C 3/06 452/32 |
| 2008/0317915 A1 | 12/2008 | Hu et al. | |

* cited by examiner

METHOD FOR PREPARING A CASING MATERIAL USED IN A CO-EXTRUDING PROCESS OF A FOOD PRODUCT, VISCOUS GELLING AGENT AND A METHOD AND A SYSTEM FOR PREPARING FOOD PRODUCTS

BACKGROUND OF THE INVENTION

The present invention relates to a method for preparing a casing material for use in co-extruding food products. The present invention further relates to a method and a system for preparing food products by means of co-extrusion wherein such casing material is used.

In the preparation of food products by means of co-extrusion, and more specific in the production of sausages, a strand of food dough is extruded together with the extrusion of an external layer of viscous gelling solution. The viscous gelling solution that, as a result, at least partially encloses the strand of food dough is subsequently treated (hardened) to form the casing of the food product (sausage). For the casing material, use may be made of various viscous gelling solutions, which dependent on the product to be produced, are ordered from a specialised producer of such gelling solutions. After the supply of the ordered viscous gelling solutions the viscous gelling solutions has to be used within a set period.

The problem to be solved is to improve the efficiency and/or the effectiveness of the usage of gelling solutions in the co-extrusion process of food products while maintaining the prior art advantages of the co-extrusion of food products.

SUMMARY OF THE INVENTION

As a solution the present invention provides a method for preparing a casing material used in a co-extruding process of a food product, comprising the steps of: a) providing two or more casing material components; b) mixing the casing material components provided during processing step a) to a viscous gelling solution; and c) feeding the viscous gelling solution of processing step b) to the co-extrusion process of a food product to be co-extruded as an external layer on a to be extruded strand of food dough, wherein each of the casing material components provided during processing step a) in itself is not suitable for co-extrusion as an external layer and wherein the composition of the viscous gelling solution is determined by changing the volumes of the casing material components provided during processing step a) dependent on the required specification of the food product to be co-extruded and/or the composition of the viscous gelling solution is adjusted by changing the volumes of the casing material components dependent on the information on the properties of the food dough and/or the food product to be co-extruded.

Preferably one or more of the casing material components provided during processing step a) are chosen from the group consisting of: water, alginate powder, alginate gel, collagen powder, collagen gel, strong acidic solution, weak acidic solution, strong alkaline solution and weak alkaline solution. In this respect the acidic solution and the alkaline solution may also be referred to in combination as "buffer solution". It is further noted that the one or more casing material components may include pre-mixtures of the above-listed casing material components. Preferably, the pre-mixtures are stable and can be stored on site for a prolonged period before being used to form the viscous gelling solution of the present invention. Thus the various casing material components like one or more aqueous media, one or more dry gelling agents, and/or one or more semi-manufactured viscous gelling agents are on site, that is to say close to the food product co-extrusion, mixed to a dedicated composition of the viscous gelling solution that fits the actual co-extrusion process.

In a specific embodiment the mixing of the plural components to a viscous gelling solution is coupled to the co-extrusion process so the mixing takes place "in-line" with the co-extrusion and/or the mixing is to be understood as a per-use preparation of the viscous gelling solution for the co-extrusion of the food products. The composition of the viscous gelling solution may according to the present invention be changed in a relative short period ("on the fly") for example during the co-extrusion of food products. The composition of the viscous gelling solution may be determined and/or adjusted during the co-extrusion process of a food product by changing the proportions/ratios of the casing material components used to compose the viscous gelling solution and/or by changing the components used to compose the viscous gelling solution. It is noted that by changing the volumes of the casing material components according to the present invention, both the proportions/ratios of the components contained in the viscous gelling solution as well as the composition of the viscous gelling solution may be determined and/or adjusted.

Thus, with the method of the present invention not only quick change in composition of the viscous gelling solution is now possible, but it is also possible to change the composition/properties continuously (as a contrast to the discrete changes in composition/properties according the prior art). Some of the advantages of this method are that the properties of the food product (especially the properties of the casing of the food products) can be optimised. Furthermore the price of the casing material components to be used for producing food products as well as the process conditions can be optimised. E.g. an excess of functionality of the viscous gelling solution (to be on the safe side of the production window) can now be diminished leading to less costs in casing material components and in shorter subsequent processing steps due to the possibility of adjusting/tailoring the properties of the viscous gelling solution. A further advantage is that only such volumes of viscous gelling solution can be produced as required; leading to less throw-away of unusable gelling solution following viscous gelling solution decay, which throw-away leads to higher prices of the food products.

As already mentioned above, information on the properties of the food product to be co-extruded may be used to influence the composition of the viscous gelling solution produced during processing step b). Such information on the properties of the food product to be co-extruded may be obtained by measurement of light reflection or measurement of the pH-level of the casing material of the food product shortly after co-extrusion or later after a subsequent treatment like for instance pre-drying of the co-extruded food product. The information on the properties of the food product to be co-extruded may be measured automatically and/or manually and these measurements can be made off-line or in-line. By generating information on the properties of the co-extruded food product a direct feedback process regulation is possible to achieve the desired properties of the viscous gelling solution, thus leading to more control of the production process and the quality of the food products.

Alternatively, or in addition to the information obtained from the food product to be co-extruded, information on the properties of the food dough to be co-extruded may be used to influence the composition of the viscous gelling solution produced during processing step b). The composition of the food dough used in the co-extrusion process may vary over time. Any variation in the composition will lead to variations in the quality of the food products to be co-extruded. By providing a method wherein the composition of the viscous gelling solution is influenced based on the information on the properties of the food dough, a constant quality of the food products to be co-extruded can be assured. In other words, by directly linking the measured properties of the food dough with the composition of the viscous gelling solution to be provided onto the measured food dough, a more controlled production process is provided leading to a more predictable outcome of the production process as well as a reduction of rejected food product not meeting the predetermined quality requirements. The information on the properties of the food dough may be obtained by similar measurements as described above for the food product. However, in contrast to the measurements described above for the food product, the information on the properties of the food dough is typically obtained, either automatically and/or manually, before co-extrusion of the food dough and/or viscous gelling solution.

In an embodiment the viscous gelling solution comprises collagen. The collagen may be combined with alginate to form a collagen/alginate mixture. Such viscous gelling solution is especially suited to be mixed in-line.

During processing step b) at least one dry gelling agent may be added to at least one aqueous medium, in which situation the dry gelling agent may be a powder. As an alternative or in combination it is also possible that during processing step b) at least two semi-manufactured viscous gelling agents are mixed. The present invention is not limited to any specific type of component mixing. As a further alternative for instance it is also possible that during processing step b) at least two dry gelling agents are mixed, and subsequently the mixed composed dry gelling agent is further mixed with an aqueous medium. Thus all suitable types of mixing of material flows are part of the composing of the viscous gelling solution according the present invention; e.g. during one or more subsequent processing step(s) plural flows of dry gelling agents (powders), aqueous media and/or semi-manufactured viscous gelling agents may be mixed together to form a gelling solution used in the co-extrusion process. A further alternative, used alone or in combination with the previous embodiments in composing the viscous gelling solution is to use one or more pre-set (pre-made) gel mixes.

To enable forward regulation (feed-forward regulation) of the properties of the co-extruded food products information on the properties of one or more of the casing material components may be provided during processing step a) which then may be used for regulating the proportions of the gel solution components provided for use. The properties of one or more of the casing material components may be provided by measurement on dry gelling agents, aqueous media, semi-manufactured viscous gelling agents and/or the viscous gelling solution. Such measurement may take place in-line or off-line and may be performed manually and/or automatically. The measurements are then utilized to change the composition of the gel solution produced depending upon, for instance, situation dependent information on the properties of one or more of the components used for the composition of the viscous gelling solution and/or environmental conditions (like temperature and/or atmospheric humidity).

To provide even more influence on the properties of the viscous gelling solution the casing material components provided during processing step a) may also comprise an additive that is selected from an emulsifying agent, a buffer solution, a structure improver, a strengthening agent, a thickener agent and/or combinations thereof.

When different types of food products are produced on co-extrusion equipment the viscous gelling solution may be composed according to various pre-set recipes. By e.g. intelligent steering with a computer controlled steering system, different types of food products may trigger the use of different compositions of the viscous gelling solution utilizing different pre-set recipes. Such a computer controlled steering system may be a passive system (receiving input before the production starts), but may also be fed by situation dependent information on the properties of one or more of the casing material components used for the composition of the viscous gelling solution and/or environmental conditions (like temperature or atmospheric humidity). The use of such "recipe-type" of process regulation enables a simple and quick adjustment of the co-extrusion equipment when different types of food products are subsequently to be produced, leading to greater production flexibility, lower production costs and a higher, more consistent product quality.

Another alternative is that the mixing of the casing material components to a viscous gelling solution according to processing step b) may comprise a plurality of mixing phases; for example a first mixing phase wherein a first dry powder gelling agent is added to an aqueous medium wherein the components are mixed at a relative low speed; a second mixing phase wherein the obtained semi-manufactured viscous gelling agent is mixed at a higher speed than the mixing speed during the first mixing phase, which second mixing phase takes place under a gas pressure of less than 0.2 bar, preferably a gas pressure of less than 0.1 bar, during a period of [2, 4] minutes. The method may, in between the first mixing phase and the second mixing phase, also comprise an intermediate mixing phase wherein a second dry powder gelling agent is added to the semi-manufactured viscous gelling agent resulting from the first mixing phase and the mixing speed during the intermediate mixing phase is higher than during the first mixing phase but lower than during the second mixing phase. As for the period of mixing the obtained aqueous solution during processing step b) positive results are achieved with a time period of [2.5, 3.5] minutes. With such a mixing method viscous gelling solutions may be prepared that have uniform quality and without, or with only very limited, enclosures of air (gas bubbles).

In an embodiment of the present invention, the casing material components are pre-mixed before the mixture of casing material components is provided during step a). Preferably casing material components in dry form are mixed with each other to form a mixture of dry ingredients. Separately other or similar casing material components are mixed with water to form a mixture of wet ingredients. It is noted that the formation of the wet ingredients, the order of addition may play an important role in obtaining the desired composition of wet ingredients having the desired product characteristics, e.g. correct viscosity, texture, and the like. Subsequently both dry and wet ingredients are mixed during process step b) to form the viscous gelling solution.

Optionally, in order to improve the product characteristics of the viscous gelling solution and, inherently, the final food product quality of the food product to be co-extruded, the viscous gelling solution formed in step b) may further be subjected to a vacuumizing step before feeding the viscous gelling solution to the co-extrusion process of step c). In addition or alternatively, the viscous gelling solution of step b) may further be subjected to a filtering step.

On one hand, the viscous gelling solution formed in step b) may be directly used in step c), i.e. direct feeding of the freshly formed viscous gelling solution to the co-extrusion of step c). By directly feeding the formed viscous gelling solution to the co-extrusion process, a continuous process is provided. On the other hand, the present invention is not limited to a continuous process as described above. The formed viscous gelling solution in step b) may also be temporarily stored before feeding the viscous gelling solution to the co-extrusion process of step c). The temporary storage of viscous gelling solution is in particular preferred to provide a sufficient dwell time before usage of the viscous gelling solution.

In respect of preparing a solution with uniform quality it may also be advantageous to mix the casing material components to a viscous gelling solution including mechanical emulsifying of the mixture, e.g. by dynamic mixing.

To provide a viscous gelling solution with uniform quality that is also stable in the period up to the co-extrusion process the average temperature of the casing material components provided during processing step a) may be [0, 24]° C.

The present invention also provides the viscous gelling agent obtainable by the method according to any of the preceding claims. For the advantages of such viscous gelling agent reference is made to the advantages mentioned above in relation to the method according the present invention.

The invention also provides a method for preparing food products by means of co-extrusion, comprising the steps of: d) providing a food dough; e) providing the viscous gelling solution produced as described in any embodiment above; f) co-extruding a strand of food dough and an external layer of viscous gelling solution, wherein the viscous gelling solution at least partially encloses the strand of food dough; g) treating the exterior of the food strand with an aqueous salt solution; and h) dividing the food strand into separated parts. The period between finalising processing step e) and the start of processing step f) is preferably less than 1 hour, e.g. less than 30 minutes.

The present invention also relates to a system for co-extrusion of food products, the system comprising a co-extrusion unit for extruding a strand of food dough at least partially enclosed by a simultaneously extruded layer of viscous gelling solution, the co-extrusion unit having a food dough inlet and a casing material inlet; wherein the system further comprises at least one mixing unit for receiving and mixing a plurality of casing material components, which casing material components in themselves are not suitable for extruding a layer of viscous gelling solution, wherein the mixing unit is provided with at least two casing material component supplies and a viscous gelling solution outlet, and wherein the viscous gelling solution outlet of the mixing unit is connected to the casing material inlet of the co-extrusion unit. With this system, the method according the present invention can be realised. For the advantages of such system reference is made to the advantages already mentioned in relation to the method according the present invention. Due to the fixed coupling of the mixing unit and the co-extrusion unit the preparation of the viscous gelling solution takes place in-line with the co-extrusion process requiring minimal storage of viscous gelling solution thus enabling a very short loop feedback regulation/control of the viscous gelling solution quality.

The system may further comprise a control unit operably connected to the co-extrusion unit, the mixing unit and the at least two casing material component supplies connecting to the mixing unit to control the flows of casing material components to be mixed in the mixing unit and to control the mixing unit. The amounts of casing material components, as well as the mixing order, may be regulated and determined by the control unit. The control unit enables mechanisation, or even automation, of the preparation of the viscous gelling solution and the co-extrusion processes.

The control unit may also comprise a memory with stored pre-set viscous gelling solution preparation recipes, which viscous gelling solution preparation recipes dictate the casing material component supplies and the operation of the mixing unit, and wherein gel preparation instructions are selectable using an interface to the control unit. With the recipes pre-set quantities (ratios) of the various casing material component used may be regulated (as well as which casing material components are used and not-used for a specific recipe). The recipes may also control other process conditions like for instance the (mixing) speed(s), processing times and temperatures. The interface may be operable by a human operator for manual setting a specific recipe. As a further alternative, the system may also comprise at least one sensor and the interface may receive input from the sensor. Such sensor may detect information relating to the output and/or input of the co-extrusion unit which information may be used by the control unit to change one or more process conditions and/or one or more casing material component feeds.

The system may further comprise a storage tank (or use tank) to temporarily store the viscous gelling solution formed before the viscous gelling solution is transferred to the co-extrusion unit. Optionally, the system further comprises a filtering unit for receiving viscous gelling solution, which filtering unit comprises at least one filtered viscous gelling solution outlet, wherein the filtered viscous gelling solution outlet of the filtering unit is connected to the casing material inlet of the co-extrusion unit.

In a further embodiment, the system of the present invention comprises a vacuumizing unit positioned upstream from the co-extrusion unit and positioned downstream from the mixing unit, in order to vacuumize the viscous gelling solution formed before feeding the viscous gelling solution to the co-extrusion unit.

Even further, the system may further comprise additional mixers, such as static mixers, positioned upstream from the mixing unit and positioned downstream from the casing material components feeders. Suitable casing material components feeders may include, but are not limited to, casing material component hoppers, exchangeable casing material component holders, drums and/or packages or the like. The use of additional mixers as described in this paragraph are in particular preferred in a continuous process, wherein the viscous gelling agent is directly fed to the co-extrusion unit, instead of first storing the viscous gelling agent in a storage tank as described above.

The present invention will be further elucidated on the basis of the non-limitative exemplary embodiments shown in the following figures. Herein:

DETAILED DESCRIPTION OF THE PREFERRED EMBODIMENT

Figure 1:
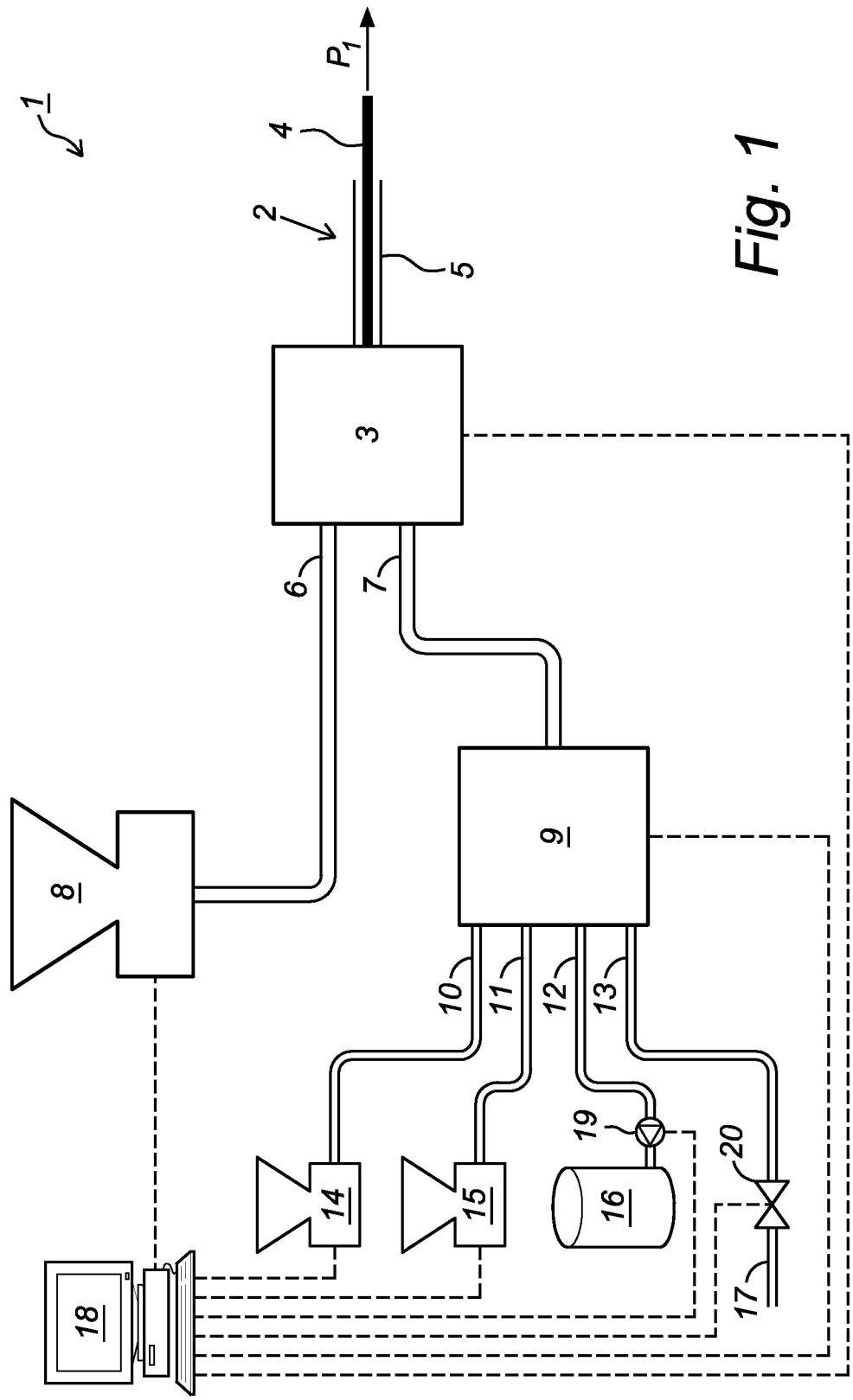
FIG. 1 shows a schematic view on a system for co-extrusion of food products according the present invention.

FIG. 1 shows a system 1 for co-extrusion (P1) of food products 2 (e.g. sausages). The system comprises a co-extrusion unit 3 for extruding a strand of food dough 4 enclosed by a simultaneously extruded layer of viscous gelling solution 5. The co-extrusion unit 3 has a food dough inlet 6 and a casing material inlet 7. The food dough inlet 6 connects to a food dough feeder 8 (e.g. a meat mass hopper) while the casing material inlet 7 connects to a mixing unit 9 for the preparation of the casing material (viscous gelling solution). The mixing unit 9 is fed by a plurality of casing material supplies 10-13, each providing a different type of casing material component. It is however also possible that two (or even more) casing material supplies 10-13 feed an identical casing material component for instance to enable continuous feed of the specific casing material component from holders/drums/packages that require exchange. In the figure shown two material supplies 10, 11 connect to casing material component hoppers 14, 15 that e.g. can feed a dry powder casing material components, a third material supply 12 that connects to a drum 16 for feeding a liquid casing material component and a fourth material supply 13 that connects to a pipe 17 (e.g. a water pipe) to feed a further liquid (e.g. water). In the mixing unit 9 a selected number of the possible casing material components are mixed in a required proportion and with specific process conditions. For operating the system 1 a control unit 18 is provided that connects to the co-extrusion unit 3, food dough feeder 8, mixing unit 9, casing material component hoppers 14, 15, a pump 19 connecting to drum 16 and a valve 20 in the pipe 17. With the control unit 18 the process for co-extrusion of food products 2 can be controlled including control of the composition of the casing material.

Figure 2:
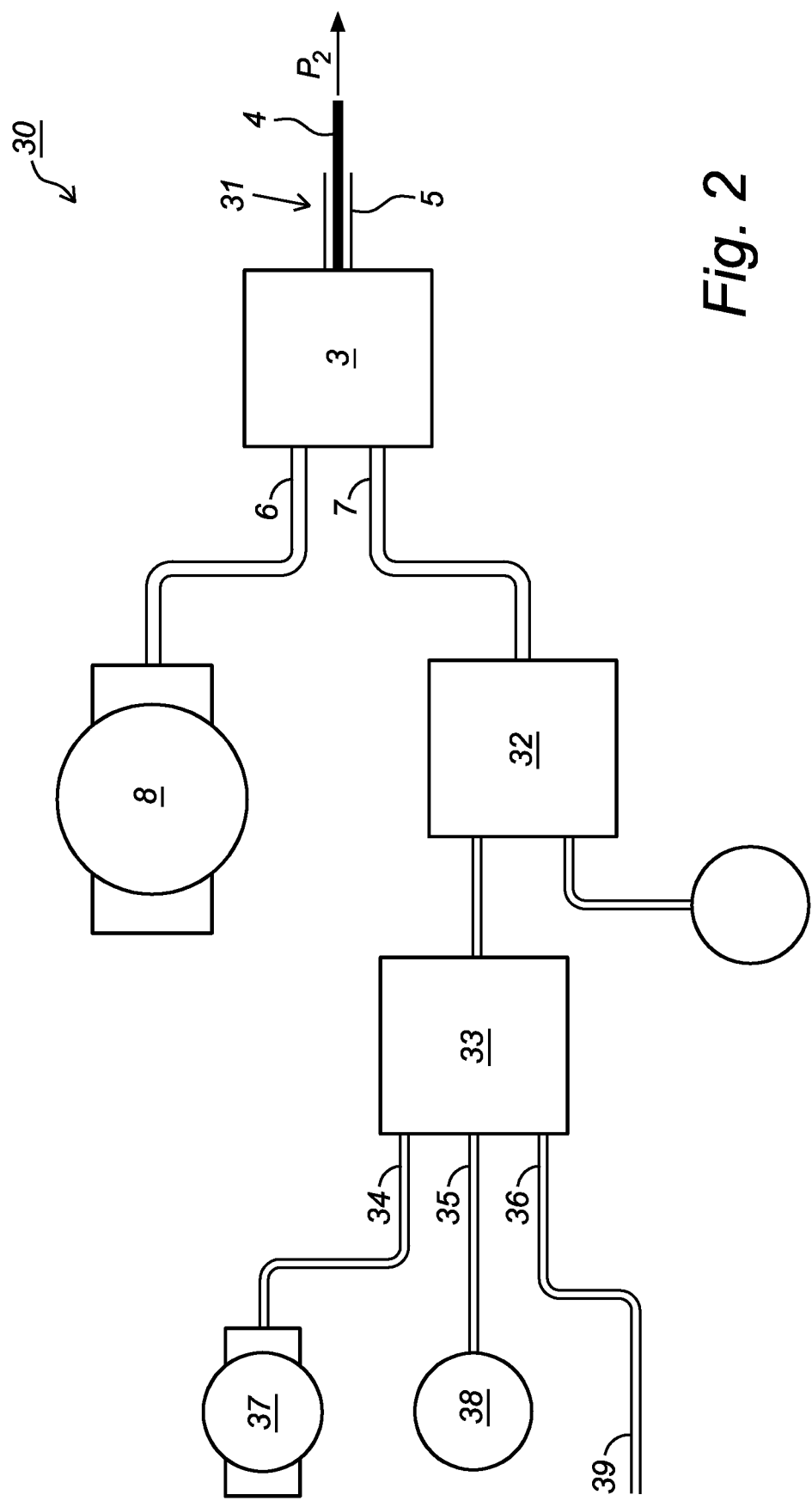
FIG. 2 shows a schematic top view on an alternative embodiment of a system for co-extrusion of food products according the present invention.

FIG. 2 shows a schematic top view on an alternative embodiment of a system 30 for co-extrusion (P2) of food products 31 wherein the reference signs to parts that correspond with parts of the system 1 as shown in FIG. 1 are referred to with identical reference signs.

The system 31 comprises a co-extrusion unit 3 for extruding a strand of food dough 4 enclosed by a layer of viscous gelling solution 5. The co-extrusion unit 3 has a food dough inlet 6 and a casing material inlet 7. The food dough inlet 6 connects to a food dough feeder 8 (e.g. a meat mass hopper) while the casing material inlet 7 connects to a second mixing unit 32 for the final preparation of the casing material (viscous gelling solution). The second mixing unit 32 is positioned in-line behind a first mixing unit 33, which first mixing unit 33 is fed by three casing material supplies 34-36, each providing a different type of casing material component. Two of the material supplies 34, 35 connect to casing material component hoppers 37, 38, a third material supply 36 connects to a pipe 39 (e.g. a water pipe) to feed a further liquid (e.g. water).

In the mixing unit 9 a selected number of the possible casing material components are mixed in a required proportion and with specific process conditions. For operating the system 1 a control unit 18 is provided that connects to the co-extrusion unit 3, food dough feeder 8, mixing unit 9, casing material component hoppers 14, 15, a pump 19 connecting to drum 16 and a valve 20 in the pipe 17. With the control unit 18 the process for co-extrusion of food products 2 can be controlled including control of the composition of the casing material.

The invention claimed is:

1. A method for preparing food products by co-extrusion, comprising the steps of:
    a) providing a food dough;
    b) providing a viscous gelling solution; and
    c) co-extruding a strand of food dough and an external layer of viscous gelling solution, wherein the viscous gelling solution at least partially encloses the strand of food dough,
    d) treating an exterior of the strand of food dough with an aqueous salt solution; and
    e) dividing the strand of food dough into separated parts wherein the preparation of the viscous gelling solution provided in step b) comprises the steps of:
        i) providing two or more casing material components;
        ii) mixing the casing material components provided during processing step i) to a viscous gelling solution; and
        iii) feeding the viscous gelling solution of processing step ii) to the co-extrusion step c),
    wherein each of the casing material components provided during processing step i) is not suitable for co-extrusion as an external layer and wherein:
        the composition of the viscous gelling solution is adjusted by changing the volumes of the casing material components dependent on the required specification of the co-extruded food product; and/or
        the composition of the viscous gelling solution is adjusted by changing the volumes of the casing material components dependent on the information on the properties of the food dough and/or the co-extruded food product and wherein the mixing in step ii) is coupled to the co-extrusion and is a per-use preparation of the viscous gelling solution for the co-extrusion of food products.

2. The method according to claim 1, wherein one or more of the components provided during processing step i) is chosen from the group consisting of: water, alginate powder, alginate gel, collagen powder, collagen gel.

3. The method according to claim 1, wherein the composition of the viscous gelling solution is determined and/or adjusted during the co-extrusion process of a food product and/or between subsequent co-extrusion process runs of different food products.

4. The method according to claim 1, wherein the information on the properties of the food dough and/or the co-extruded food product is measured automatically and/or manually.

5. The method according to claim 1, wherein the viscous gelling solution comprises collagen.

6. The method according to claim 1, wherein during processing step ii):
    at least one dry gelling agent is added to at least one aqueous medium;
    at least two semi-manufactured viscous gelling agents are mixed; and/or
    at least two dry gelling agents are mixed, and subsequently the mixed composed dry gelling agent is mixed with the aqueous medium.

7. The method according to claim 1, wherein information on the properties of one or more of the casing material components provided during processing step i) is used for steering the proportions of the components provided.

8. The method according to claim 1, wherein the viscous gelling solution is composed according to various pre-set recipes.

9. The method according to claim 1, wherein the mixing of the casing material components to a viscous gelling solution according to processing step ii) comprises plural mixing phases; a first mixing phase wherein a first dry powder gelling agent is added to an aqueous medium wherein the components are mixed at a relative low speed; a second mixing phase wherein the obtained semi-manufactured viscous gelling agent is mixed at a higher speed than the mixing speed during the first mixing phase, which second mixing phase takes place under a gas pressure of less than 0.2 bar during a period of 2 to 4 minutes.

10. The method according to claim 9, wherein the method in between the first mixing phase and the second mixing phase also comprises an intermediate mixing phase wherein a second dry powder gelling agent is added to the semi-manufactured viscous gelling agent resulting from the first mixing phase and the mixing speed during the intermediate mixing phase is higher than during the first mixing phase but lower than during the second mixing phase.

11. The method according to claim 9, wherein the period of mixing the obtained aqueous solution during processing step ii) is 2.5 to 3.5 minutes.

12. The method according to claim 1, wherein the mixing of the casing material components to a viscous gelling solution during step ii) comprises mechanical emulsifying of the mixture.

13. The method according to claim 1, wherein the average temperature of the casing material components provided during processing step i) is 0 to 24° C.

14. The method according to claim 1, the method further comprises the steps of:
   d) treating the exterior of the food strand with an aqueous salt solution; and
   e) dividing the food strand into separated parts.

15. The method according to claim 1, wherein the period between finalizing processing step b) and the start of processing step c) is less than 1 hour.

16. A system for co-extrusion of food products, the system comprising a co-extrusion unit for extruding a strand of food dough at least partially enclosed by a simultaneously extruded layer of viscous gelling solution, the co-extrusion unit having a food dough inlet and a casing material inlet;
   wherein the system further comprises at least one mixing unit for receiving and mixing a plurality of casing material components, which casing material components are not suitable for extruding a layer of viscous gelling solution;
   wherein the at least one mixing unit is provided with at least two casing material component supplies and a viscous gelling solution outlet, and wherein the viscous gelling solution outlet of the at least one mixing unit is connected to the casing material inlet of the co-extrusion unit;
   wherein the system further comprises a control unit operably connected to the co-extrusion unit, the at least one mixing unit and the at least two casing material component supplies connecting to the at least one mixing unit to control the flows of casing material components to be mixed in the at least one mixing unit and to control the at least one mixing unit.

17. The system according to claim 16, wherein the control unit comprises a memory with stored pre-set viscous gelling solution preparation recipes, which viscous gelling solution preparation recipes dictate the casing material component supplies and the operation of the mixing unit, and wherein gel preparation instructions are selectable using an interface to the control unit.

18. The system according to claim 17, wherein the interface is operable by a human operator and/or the interface receives input from at least one sensor comprised by the system.

* * * * *